United States Patent Office 3,562,276
Patented Feb. 9, 1971

3,562,276
DIARYLCYCLOPROPANE PIPERAZIDES POSSESSING ENHANCED ANTIHISTAMINIC, ANTISEROTONINIC AND ANTIEXUDATIVE ACTIVITY
Uberto Teotino and Davide Della Bella, Milan, Italy, assignors to Whitefin Holding S.A., Lugano, Switzerland
No Drawing. Filed Jan. 17, 1967, Ser. No. 609,754
Claims priority, application Great Britain, Jan. 26, 1966, 3,510/66
Int. Cl. C07d 51/64, 51/66, 51/68, 51/70, 51/72
U.S. Cl. 260—268           4 Claims

ABSTRACT OF THE DISCLOSURE

There is provided novel diarylcyclopropane derivatives of the following formula:

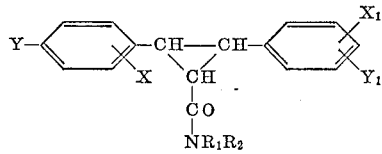

wherein X, Y, $X_1$ and $Y_1$ are hydrogen, lower alkyl, halogen, trifluoromethyl or lower alkoxy; $R_1$ and $R_2$ taken together with the nitrogen atom to which they are attached are piperidinyl, pyrrolidinyl, morpholinyl, simple or substituted piperazinyl where the substituent is a lower alkyl group; and the non-toxic, pharmaceutically acceptable acid addition salts thereof exhibiting antihistaminic, antiserotoninic and antiexudative activity.

---

This invention relates to novel diarylcyclopropane derivatives having valuable therapeutic utility and to processes for their preparation.

According to the present invention we provide, as new compounds, diarylcyclopropane-derivatives of the general formula:

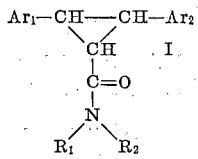

wherein $Ar_1$ and $Ar_2$ are the same or different and each is an aryl or substituted aryl radical, the substituents being one or more halogen atoms, (lower)-alkyl, (lower)-alkoxy, trifluoromethyl, hydroxy, nitro, amino, mono- or di-(lower)-alkylamino radicals; $R_1$ is a hydrogen atom, straight or branched chain alkyl radical, hydroxy-(lower) alkyl, aminoalkyl, N-mono-substituted aminoalkyl or N,N-di-substituted aminoalkyl radical; $R_2$ is a straight or branched chain alkyl radical, cycloalkyl, aryl-(lower) alkyl, arylcycloalkyl-(lower)alkyl, hydroxy-(lower)alkyl, halogenalkyl, aminoalkyl, N-mono-substituted aminoalkyl or N,N-di-substituted amino-alkyl or $R_1$ and $R_2$ together with the nitrogen atom to which they are linked represent a heterocyclic ring which may contain other heteroatoms, and their salts with pharmaceutically acceptable organic and inorganic acids as well as with lower alkyl halogenides.

The invention also provides novel compounds having the formula

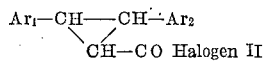 Halogen II wherein $Ar_1$ and $Ar_2$ are as defined above, which are useful intermediates in the preparation of the compounds of Formula I.

The invention further provides processes for preparing the novel therapeutically useful compound of Formula I and/or their pharmaceutically acceptable salts with organic and inorganic acids, and for the preparation of the intermediate derivatives of Formula II.

The compounds of this invention may exist as cis-cis, cis-trans and trans,trans geometrical isomers and further as d,l and dl optical isomers. Unless otherwise specified, it is intended to include in this invention all the separated geometrical isomers and their resolved optical isomers as well as mixtures thereof.

The compounds of this invention may be prepared according to various procedures which are practicable and capable of supplying the desired derivatives in good yield.

The preferred method for preparing the compounds of this invention comprises one or more of the following steps:

(a) reacting a compound of formula

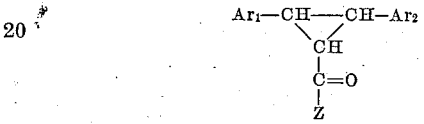

wherein $Ar_1$, $Ar_2$ are as defined above, Z is a halogen atom, O(lower) - alkyl, O—COO— (lower) alkyl, with an amine of formula $NHR_1R_2$ where $R_1$ and $R_2$ are as defined above.

(b) reacting a compound of Formula I, wherein $Ar_1$, $Ar_2$ and $R_1$ are as stated above, and $R_2$ is an halogenalkyl radical with a primary or a secondary amine in the presence of an acid binding agent, to give the corresponding compound of Formula I wherein $R_2$ is a mono- or di-substituted aminoalkyl radical.

When Z is halogen, the step a is carried out by adding the cyclopropane derivative to the amine or to an acid addition salt thereof in the presence of an acid binding agent, such as an excess of the amine itself or pyridine, a trialkylamine, a N,N-dialkylaniline or an alkali metal carbonate or dicarbonate preferably at a temperature of 0° to 50° C. The cyclopropane derivative and/or the amine may be dissolved in a suitable organic solvent such as acetone, benzene, chloroform, diethyl ether or a mixture thereof. Alternatively the cyclopropane derivative may be added to a concentrated aqueous solution of the amine. After bringing the reactants together, the reaction is completed by stirring the reaction mixture at a temperature of from 20° to 120° C. for a period of for example, from 15 minutes to 12 hours.

When Z is O—COO—(lower)alkyl the step a is carried out by adding the amine to the cyclopropane derivative at a temperature of 0° to 30° C. in the presence of a suitable organic solvent such as acetone, benzene or a mixture thereof.

When Z is O(lower)-alkyl the step a is best carried out by reacting the cyclopropane derivative with the amine in the presence of a polar solvent, such as a lower alkanol, in a sealed tube at a temperature of 90° to 180° C.

The step b is carried out in the presence of an acid binding agent and of a suitable solvent such as ethanol in a sealed tube at a temperature higher than 50° C.

The acid addition salts of this invention can be prepared in the usual manner, that is by reacting the base with either the stoichiometric amount of organic or inorganic acid in an aqueous miscible solvent, such as acetone or ethanol, with the isolation of the salt by concentration and cooling or a little excess of the acid in an aqueous immiscible solvent, such as ethyl ether or chloroform, with the desired salt separating directly. These salts may also be prepared by the conventional method of double decomposition of appropriate salts which is well known in the art.

The preferred acids are those which form non-toxic salts and include, for example, hydrochloric, hydrobromic, sulphuric, citric, acetic, tartaric, maleic and toluenesulphonic acid.

The quaternary ammonium salts of this invention may also be prepared in conventional manner by reacting the tertiary amine with a (lower)-alkyl-halide, such as methyl bromide or methyl iodide, in a sealed tube with or without the presence of an inert solvent.

The preferred method for preparing the intermediate compounds of Formula II, comprises reacting the corresponding acid with a suitable halogenating agent, such as thionyl chloride.

The novel diarylcyclopropane derivatives of this invention exhibit significant pharmacological properties and fairly low toxicity.

They are nervous system depressant agents and/or exhibit antihistaminic and antiserotoninic activity in vitro as well as antiexudative activity in vivo (plantar oedema by ovalbumin and cotton pellets in the rat).

The nervous system depressing activity has been shown in rats and mice either by the inhibition of the animal response to external stimuli or by potentiation of the duration of sleep from barbiturates.

The anthistaminic, antiserotoninic and antiexudative activity have been particularly ascertained for those compounds where $R_1$ is hydrogen and $R_2$ is N,N-dialkylaminoalkyl radical, as well as for the compounds wherein $R_1$ and $R_2$ together with the N atom to which they are bound form an heterocyclic ring containing a further N atom.

More particularly N-(2,3-cis, trans-diphenylcyclopropane-1-carbonyl)-N'-methyl-piperazine is provided with anti-inflammatory and anti-exudative properties both in normal and adrenalectomized animals (activity ratio to phenylbutazone 1 to 2 about). It possesses a marked analgestic activity (5–10 times that of acetylsalicylic acid) and a significant antipyretic effect whose activity ratio to acetyl salicylic acid is 1 to 2. Furthermore it exerts antispastic effect and is equally active when orally or parenterally administered. It is well tolerated, as appearing from the acute and chronic toxicity test and the preliminary experiments on the reproductive cycle, with regard to the doses pharmacologically effective. Unlike many of the known anti-inflammatory drugs, its chronic administration, also at the higher doses, does not cause any lesion of gastric mucose.

The compounds of the present invention and their pharmaceutically acceptable salts with organic and inorganic acids as well as with lower alkyl halogenides may be administered orally, parenterally or rectally and may be associated with solid or liquid carriers in any of the suitable pharmaceutical forms such as tablets, capsules, suppositories or vials.

A particular composition which may be prepared and used in accordance with this invention without, however, limiting the same, in the following composition for parenteral use:

N-(2,3-cis,trans-diphenylcyclopropane-1 - carbonyl)-
  N'-methyl-piperazine hydrochloride _____mg__ 100
Distilled water q.s. ad _____ml__ 2

The vials are then sterilised at 110° C. for 40 minutes.

A particular composition suitable for oral administration has the form of tablets and the following composition:

|  | Mg. |
|---|---|
| N-(2,3-cis,trans-diphenylcyclopropane - 1 - carbonyl)-N'-methyl-piperazine hydrochloride | 400 |
| Starch | 80 |
| Jelly | 15 |
| Talc | 2 |
| Magnesium stearate | 3 |

The ingredients are mixed, granulated and tableted in the ways known to those skilled in the art.

The following examples are given by way of illustration in order that the invention may be more fully understood.

EXAMPLE 1

4'-methyl-2,3-cis,trans-diphenylcyclopropane-1-carboxylic acid

In a four-necked flask equipped with a reflux condenser whereupon was fitted a dropping funnel, a distillation condenser provided with a cold finger filled with ethyl alcohol, a mechanical stirrer and a thermometer, were placed 120 g. (0.62 mole) of trans-4-methylstilbene, 6.5 g. of freshly dehydrated copper sulfate and 250 cc. of benzene and was heated to 75° C. with stirring. A solution in methylene chloride of about 200 g. ethyl diazoacetate (prepared according to the process disclosed in Organic Synthesis 36, 26) was added through the dropping funnel over a period of eight hours and a half and then allowed to stand overnight. As the solution was added methylene chloride was removed by distillation. The reaction mixture was filtered and the benzenic solution was concentrated by evaporation under reduced pressure. The oily residue was fractionated in vacuo and the fraction boiling at 115°–120° C./0.3 mm. collected. The product, being ethyl 4' - methyl - 2,3 - cis,trans-diphenylcyclopropane-1-carboxylate, was dissolved in 500 cc. of 95% ethanol. 60 g. of sodium hydroxide were added and the mixture was refluxed with stirring for six hours. The solvent was removed by distillation under reduced pressure. The residue was dissolved with 400 cc. of water, decolourized with carbon black and filtered. The aqueous solution was acidified to Congo red with 36% hydrochloric acid and shaked with ethyl ether. The ethereal extracts were washed with water, dried over anhydrous sodium sulfate and evaporated under reduced pressure. The solid residue was washed with petroleum ether, filtered and dried in vacuo. Yield, 83 g. The product may be purified by crystallization from isopropyl ether. M.P.=133°–135° C.

*Analysis.*—Calcd. for $C_{17}H_{16}O_2$ (percent): C, 80.92; H, 6.39. Found (percent): C, 80.63; H, 6.42.

In a similar manner have been prepared the following compounds:

2',4'-dichloro-2,3-cis,trans-diphenylcyclopropane-1-carboxylic acid. M.P.=133°–135° C. (from isopropyl ether).
3'-trifluoromethyl-2,3-cis,trans-diphenylcyclopropane-1-carboxylic acid. M.P.=158°–160° C. (from 50% ethyl alcohol).
2',4-dichloro-2,3-trans,trans-diphenylcyclopropane-1-carboxylic acid. M.P.=138°–140° C. (from 50% thyl alcohol).

EXAMPLE 2

2,3-cis,trans-diphenylcyclopropane-1-carbonyl chloride 50 cc. (0.69 mole) of thionyl chloride was added to a solution of 118 g. (0.49 mole) of 2,3-cis-trans-diphenylcyclopropane-1-carboxylic acid in 650 cc. of benzene and the mixture was refluxed for 7 hours. After this time, the mixture was cooled and evaporated to dryness under reduced pressure. The oily residue was fractionated and the fraction which boils at 165°–170° C./0.5 mm. was collected. Yield, 120 g.; M.P.=61°–63° C.

In a similar manner have been prepared the following compounds:

2,3-cis,trans-bis(4'-methoxyphenyl)-cyclopropane-1-carbonyl chloride. M.P.= 80°–82° C.

EXAMPLE 3

2,3-trans, trans-diphenylcyclopropane-1-carbonyl chloride 15 cc. (0.2 mole) of thionyl chloride were added to a solution of 20 g. (0.084 mole) of 2,3-trans,trans-diphenylcyclopropane-1-carboxylic acid in 75 cc. of benzene. After the addition was completed the reaction mixture was stirred at room temperature for 24–48 hours. The mixture was then evaporated to dryness under reduced pressure and the oily residue was fractionated. The fraction boiling at 150°–151° C./1 mm. was collected. M.P.=68–70° C.

In a similar manner have been prepared:

2,3-cis,cis-diphenylcyclopropane-1-carbonyl chloride. M.P.=70°–72° C.
2′,4′-dichloro-2,3-cis, trans-diphenylcyclopropane-1-carbonyl chloride. B.P.=168°–170°/0.05 mm.
2′,4′--dichloro-2,3-trans,trans-diphenylcyclopropane-1-carbonyl chloride. B.P.=148°–150°/0.025 mm.
4′-methyl-2,3-cis,trans-diphenylcyclopropane-1-carbonyl chloride. B.P.=129°–131°/0.1 mm.

EXAMPLE 4

N-methyl-2,3-cis,trans-diphenylcyclopropane-1-carbonamide

A solution of 13 g. (0.05 mole) of cis,trans-2,3-diphenyl-cyclopropane-1-carbonyl chloride in 10 cc. of anhydrous acetone was dropped, under stirring, into a solution of 45 cc. (0.5 mole) of 35% (w./v.) aqueous methylamine and 10 cc. of acetone. During this addition the temperature of the reaction mixture was kept at 0° C. After the addition was complete, the mixture was stirred for one hour and a half maintaining the temperature at 0° C. and one further hour allowing the temperature to rise to room temperature. The mixture was concentrated under reduced pressure and the residue extracted with chloroform. The chloroform layer was dried with magnesium sulphate and concentrated to dryness. Yield, 11.6 g.; M.P.=109–110° C. (from isopropyl ether).

*Analysis.*—Calcd. for $C_{17}H_{17}NO$ (percent): C, 81.24; H, 6.82; N, 5.57. Found (percent): C, 80.89; H, 6.78; N, 5.59.

Ultraviolet peak of methanol solution $(3.533 \cdot 10^{-5}$ M/1) at 221 m. (=15.710).

In a similar manner the following compounds have been prepared:

N,N-diethyl-2,3-cis,trans-diphenylcyclopropane-1-carbonamide. M.P.=113°–115° C. (from isopropyl ether).
N-(2,3-cis,trans-diphenylcyclopropane-1-carbonyl)-morpholine. M.P.=126°–128° C. (from ethyl alcohol).
N-(2,3-cis,trans-diphenylcyclopropane-1-carbonyl)-pyrrolidine. M.P.=164°–166° C. (from ethyl alcohol).
N-(2,3-cis,trans-diphenylcyclopropane-1-carbonyl)-N′-methyl-piperazine hydrochloride. M.P.=258°–260° C. (from ethyl alcohol).
N-(2,3-cis,trans-diphenylcyclopropane-1-carbonyl)-N′-methyl-piperazine. M.P.=106°–108° C. (from isopropyl ether). Its methoiodide salt melts at 190°–141° C. (from ethyl alcohol).
N-(2,3-cis,trans-diphenylcyclopropane-1-carbonyl)-piperidine. M.P.=136°–138° C. (from ethyl alcohol).
N-isopropyl-2,3-cis,trans-diphenylcyclopropane-1-carbonamide. M.P.=129°–131° C. (from ethyl alcohol).
N-cyclohexyl-2,3-cis,trans-diphenylcyclopropane-1-carbonamide. M.P.=172°–174° C. (from ethyl acetate).
N-methyl-2,3-trans,trans-diphenylcyclopropane-1-carbonamide. M.P.=174°–176° C. (from ethyl acetate).
N-methyl-2,3-cis,cis-diphenylcyclopropane-1-carbonamide. M.P.=124°–126° C. (from ethyl acetate).
4′-methyl-2,3-cis,trans-diphenylcyclopropane-1-(N-methyl)-carbonamide. M.P.=93°–95° C. from isopropyl ether).
2,3-cis,trans-Bis(p-methoxyphenyl)-cyclopropane-1-(N-methyl)-carbonamide. M.P.=134°–136° C. (from ethyl alcohol).
N-(4′-methyl-2,3-cis,trans-diphenylcyclopropane-1-carbonyl)-N′-methyl-piperazine. M.P.=151°–153° C. (from isopropyl ether).
N-[2,3-cis,trans-Bis(p-methoxyphenyl)-cyclopropane-1-carbonyl]-N′-methyl-piperazine. M.P.=84°–86° C. (from isopropyl ether).
N-[2,3-cis,trans-Bis(p-methoxyphenyl)-cyclopropane-1-carbonyl]-N′-methyl-piperazine hydrochloride. M.P.=181°–183° C. (from ethyl alcohol).
N-(2′,4′-dichloro-2,3-cis,trans-diphenylcyclopropane-1-carbonyl)-N′-methyl-piperazine. B.P.=218°–220° C./0.03 mm.; M.P.=39°–40° C.
N-(2′4′-dichloro-2,3-trans-trans-diphenylcyclopropane-1-carbonyl)-N′-methyl-piperazine. M.P.=111°–113° C. (from ethyl alcohol).
N-(3′-trifluoromethyl-2,3-cis,trans-diphenylcyclopropane-1-carbonyl)-N′-methyl-piperazine. M.P.=116°–118° C. (from isopropyl ether).

EXAMPLE 5

N-ethyl-N-(2′,3′-cis,trans-diphenylcyclopropyl-1′-methylen)-2,3-cis,trans-diphenylcyclopropancarbonamide 105 cc. of NaOH and a solution of 13.5 g. (0.05 mole) of cis,trans-2,3-diphenylcyclopropane-1-carbonyl chloride in 110 cc. of ethyl ether were dropped simultaneously in a mixture of 15 g. (0.05 mole) of 1-(N-ethyl)-aminomethyl-2,3-cis,trans-diphenylcyclopropane hydrochloride (prepared according to the process disclosed in our copending application No. 609,771), 150 cc. of water and 400 cc. of ethyl ether. This addition required about 1 hour whereas the temperature of the reaction mixture was kept at 0° C. When the addition was complete the mixture was allowed to stand at room temperature. The ethereal layer was separated and the aqueous layer was washed with ethyl ether. The combined ethereal extracts was washed with water, dried over magnesium sulfate and concentrated by evaporation of the solvent under reduced pressure. The solid residue weighing 20.5 g. and melting at 45°–47° C. was fractionated by distillation in vacuo. The fraction boiling at about 135°–137° C./0.1 mm. was collected. M.P.=48°–50° C.

*Analysis.*—Calcd. for $C_{34}H_{33}NO$ (percent): C, 86.59; H, 7.05; N, 2.97. Found (percent): C, 86.51; H, 7.03; H, 2.99.

In a similar manner have been prepared the following compounds:

N-(2′,3′-cis,trans-diphenylcyclopropyl)-2,3-cis,trans-diphenylcyclopropan-carbonamide. M.P.=124°–126° C. (from ethyl alcohol).
N-(2,3-trans,trans-diphenylcyclopropane-1-carbonyl)-N′-methyl-piperazine. M.P.=130°–132° C. (from ethyl alcohol).
N-(2,3-trans,trans-diphenylcyclopropane-1-carbonyl)-N′-methyl-piperazine hydrochloride. M.P.=261°–263° C. (from ethyl alcohol).
N-(2,3-cis,cis-diphenylcyclopropane-1-carbonyl)-N′-methyl-piperazine. M.P.=139°–141° C. (from ethyl alcohol).
N-(2,3-cis,cis-diphenylcyclopropane-1-carbonyl)-N′-methyl-piperazine hydrochloride. M.P.=201°–203° C. (from ethyl alcohol).

EXAMPLE 6

N-ethyl-2,3-cis,trans-diphenylcyclopropanecarbonamide

A solution of 14.4 g. (0.056 mole) of cis,trans-2,3-diphenylcyclopropane-1-carbonyl chloride in 50 cc. of anhydrous benzene was dropped, with stirring, into a solution of 6.3 g. (0.140 mole) of ethylamine in 50 cc. of anhydrous benzene, the temperature being kept below 10° C. After the addition was complete, stirring is continued for two hours allowing the temperature to rise up to room temperature. At the end of this time, the precipitate was removed by filtering with suction and washed with benzene. The combined filtrate and washings were washed successively with water, with diluted hydrochloric acid, and with water until the wash water gave no test for chloride ion.

The benzene solution was dried by standing over anhydrous sodium sulphate and then evaporated to dryness. Yield 14.5 g. The product was purified by crystallisation from isopropyl ether. M.P.=100°–101° C.

In a similar manner the following compound has been prepared:

N-N-dimethyl-2,3-cis,trans-diphenylcyclopropane carbonamide. M.P.=97°–99° C.

EXAMPLE 7

N-($\beta$-dimethylamino)-ethyl-2,3-cis,trans-diphenyl cyclopropanocarbonamide

A solution of 10 g. (0.030 mole) of cis,trans-2,3-diphenylcyclopropane 1-carbonyl chloride in 60 cc. of anhydrous benzene was dropped, with stirring, into a solution of 10 cc. (0.08 mole) of N,N-dimethyl-1,2-ethylendiamine in 50 cc. of anhydrous benzene; the temperature being kept at 0° C. The reaction mixture was then refluxed for about two hours. After cooling the precipitate was removed by filtration and the solution evaporated under reduced pressure. The residual oily product (13.6 g.) was dissolved in 50 cc. of diluted hydrochloric acid. This solution was decolourised with carbon black, saturated with potassium carbonate and extracted with ethyl ether. The ethereal extract was dried over magnesium sulphate and evaporated under reduced pressure. The oily residue was fractionated in a rotary film evaporator and the fraction boiling at about 175°–180° C./0.1 mm. was collected.

This product may be further purified by crystallisation from ligroin or from a mixture petroleum ether heptane 4:0.7—M.P.=80° C.–81.5° C.

*Analysis.*—Calcd. for $C_{20}H_{24}N_2O$ (percent): C, 77.89; H, 7.84; N, 9.08. Found (percent): C, 77.14; H, 7.92; N, 9.04.

Ultraviolet peak of methanol solution ($3.793 \cdot 10^{-5}$ M/l.) at 22 m$\mu$ ($\epsilon$=20.107)—Minimum at 215 m$\mu$ (HCl 0.1 N).

EXAMPLE 8

N($\gamma$-dimethylamino)-propyl-2,3-cis,trans-diphenyl-cyclopropanecarbonamide

A solution of 79.8 g. (0.31 mole) of cis,trans-2,3-diphenylcyclopropane-1-carbonyl chloride in 310 cc. of anhydrous chloroform was dropped, with stirring into a solution of 92 g. (0.9 mole) of $\gamma$-dimethylaminopropylamine in 310 cc. of chloroform, the temperature being kept at 40° C. When the addition was complete, the reaction mixture was refluxed for four hours. After cooling, the mixture was successively washed with water, with an aqueous solution of sodium bicarbonate and again with water. The chloroformic solution was dried over sodium sulphate and the solvent removed by evaporation under reduced pressure. The oily residue was dissolved with diluted acid, whereupon the solution was decolourised with carbon black, saturated with potassium carbonate and extracted with chloroform. The chloroformic solution was dried over sodium sulphate and filtered. After evaporation of chloroform, the oily residue was distilled in a rotary film evaporator. The fraction which boils at about 200°–205° C./0.3 mm. was collected. M.P. 44°–46° C.

EXAMPLE 9

N-($\gamma$-hydroxy)-propyl-2,3-cis,trans-diphenyl-cyclopropanocarbonamide

A solution of 20 g. (0.077 mole) of cis-trans-2,3-diphenylcyclopropane 1-carbonyl chloride in 75 cc. of anhydrous benzene was dropped, with stirring, into a solution of 20 g. (0.26 mole) of $\gamma$-hydroxypropylamine in 100 cc. of benzene, the temperature being kept at room temperataure. When the addition was complete, the stirring was continued for one hour at room temperature and for two hours and a half at boiling temperature. After cooling, the reaction mixture was washed successively with water, diluted hydrochloric acid, a satured aqueous solution of sodium bicarbonate, and water. Then benzenic layer was dried over anhydrous magnesium sulfate and concentrated by evaporating the solvent under reduced pressure. The oily residue was distilled in a rotary film evaporator and the fraction boiling at about 205°–210° C./0.1 mm. was collected. The production was purified by crystallisation from benzene. M.P.=83°–85° C.

*Analysis.*—Calcd. for $C_{19}H_{21}NO_2$ (percent): C, 77.26; H, 7.16; N, 4.74. Found (percent): C, 76.91; H, 7.21; N, 4.75.

Ultraviolet peaks of a methanol solution ($3.4 \cdot 10^{-5}$ M/l.) at 211 m$\mu$ ($\epsilon$=2.530) and 221 m$\mu$ ($\epsilon$=21.175).

In a similar manner the following compound has been prepared: N,N-di-sec.-butyl-2,3-cis, trans-diphenylcyclopropanecarbonamide.

B.P.=204°–205°/0.5 mm.; M.P.=86°–88° C.

EXAMPLE 10

N-($\gamma$-chloro)-propyl-2,3-cis,trans-diphenylcyclo-propanecarbonamide 20 cc. (0.45 mole) thionyl chloride was added to a solution of 19 g. (0.064 mole) of N-($\gamma$-hydroxy)-propyl-2,3-cis,trans-diphenylcyclopropanocarbonamide (prepared according to the process disclosed in Example 9) in 300 cc. of benzene. After standing three days at room temperature, the solution was concentrated by evaporating the solvent under reduced pressure. The residue was suspended in petroleum ether, collected by filtration, washed with petrolem ether and dried in vacuo. Yield, 18.30 g.; M.P.=121°–123° C.

EXAMPLE 11

N-(N'-methyl,N'-benzyl-aminopropyl - 2,3 - cis,trans-diphenylcyclopropane-1-carbonamide hydrochloride 13.5 g. (0.04 mole) of N-($\gamma$-chloro)-propyl-2,3-cis, trans-diphenylcyclopropanecarbonamide (prepared according to the process disclosed in Example 10) were added to 30 cc. of anhydrous ethyl alcohol and 20 cc. (0.65 mole) of N-methyl-benzylamine, the resulting solution was placed in a sealed tube and warmed at 90° C. for 64 hours. After cooling at room temperature, the suspension was concentrated by evaporating the solvent. The residue was dissolved with a diluted solution of hydrochloric acid (acid to Congo red) by heating. The cold solution was washed with ethyl ether, made alkaline with potassium carbonate and shaken with ethyl ether. The ethereal extract was dried over sodium sulfate and the solvent was removed by evaporation at reduced pressure. The residue was distilled in vacuo. The fraction which boils at 206°–208° C./0.25 mm. was collected. Yield 10.8 g. The product was dissolved in ethyl ether and treated with hydrochloric acid gas. The precipitate was collected by suction, dried and purified by crystallization from acetone. M.P.=159–161° C.

EXAMPLE 12

N-methyl-2,3-cis,trans-diphenylcyclopropancarbonamide

Into a suspension of 10 g. (0.03 mole) of 2,3-cis,trans-diphenylcyclopropane-1-carboxylic acid in 75 cc. of acetone were dropped, with stirring, 4.50 g. (0.04 mole) of triethylamine maintaining the temperature of the reaction mixture at 0° C. Stirring is then continued for an additional 10 minutes. After this time 4.75 g. (0.04 mole) of ethyl chlorocarbonate were added, the temperature being kept at 0° C. with constant stirring. After 10 minutes 15 cc. of a 15% solution w./v. of methylamine in benzene were dropped allowing the temperature of the reaction mixture to rise to room temperature. The reaction mixture was then poured into 300 cc. of water and extracted with benzene. The combined benzenic extracts were dried over sodium sulfate, filtered and concentrated to dryness by evaporating the solvent under reduced pressure. The residue was washed with petroleum ether, filtered and dried in vacuo at 50° C. Yield 8.70 g. After crystallisation from isopropyl ether the product melts at 108°–110° C.

We claim:
1. A compound of the formula

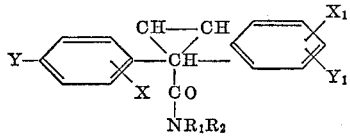

wherein X, Y, $X_1$ and $Y_1$ are members selected from the group consisting of hydrogen, lower alkyl, halogen, trifluoromethyl and lower alkoxy; $R_1$ and $R_2$ taken together with the nitrogen atom to which they are attached are a heterocyclic group selected from the group consisting of a simple or N-substituted piperazine group wherein the N substituent is a lower alkyl group; and the non-toxic, pharmaceutically acceptable acid addition salts thereof.

2. N-(2,3 - cis,trans - diphenylcyclopropane - 1 - carbonyl)-N'-methyl-piperazine.

3. N-(2,3 - cis,cis - diphenylcyclopropane-1-carbonyl)-N'-methyl-piperazine.

4. N - (2,3 - trans,trans - diphenylcyclopropane-1-carbonyl)-N'-methyl-piperazine.

References Cited

UNITED STATES PATENTS

| | | | |
|---|---|---|---|
| 3,098,076 | 7/1963 | Baltzcy | 260—294.7 |
| 3,147,261 | 9/1964 | Mod | 260—268 |
| 3,277,171 | 10/1966 | Hopkins | 260—268X |
| 3,438,993 | 4/1969 | Wilbert | 260—295 |
| 3,423,461 | 1/1969 | Kaiser | 260—570.5 |

OTHER REFERENCES

Jones et al.: Chem. Abstr., vol. 54, col. (1305) (1960).

DONALD G. DAUS, Primary Examiner

UNITED STATES PATENT OFFICE
CERTIFICATE OF CORRECTION

Patent No. 3,562,276      Dated February 9, 1971

Inventor(s) Uberto Teotino et al.

It is certified that error appears in the above-identified patent and that said Letters Patent are hereby corrected as shown below:

Column 9, Claim 1, the formula should appear as shown below:

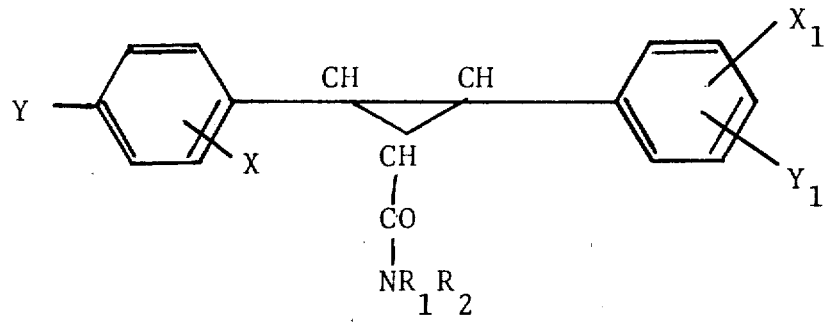

Signed and sealed this 9th day of November 1971.

(SEAL)
Attest:

EDWARD M. FLETCHER, JR.
Attesting Officer

ROBERT GOTTSCHALK
Acting Commissioner of Pate

UNITED STATES PATENT OFFICE
CERTIFICATE OF CORRECTION

Patent No. 3,562,276        Dated February 9, 1971

Inventor(s) Uberto Teotino et al.

It is certified that error appears in the above-identified patent and that said Letters Patent are hereby corrected as shown below:

IN THE TITLE:

Change "PIPERAZIDES" to --PIPERAZINES--.

Signed and sealed this 15th day of February 1972.

(SEAL)
Attest:

EDWARD M. FLETCHER, JR.        ROBERT GOTTSCHALK
Attesting Officer              Commissioner of Patents